US008550918B2

(12) United States Patent
Shepherd

(10) Patent No.: US 8,550,918 B2
(45) Date of Patent: Oct. 8, 2013

(54) SYSTEMS FOR COORDINATING A DISTRIBUTED GAME IN A GAMING ENVIRONMENT

(75) Inventor: Dale Shepherd, Fort Collins, CO (US)

(73) Assignee: Bally Gaming, Inc., Las Vegas, NV (US)

( * ) Notice: Subject to any disclaimer, the term of this patent is extended or adjusted under 35 U.S.C. 154(b) by 708 days.

(21) Appl. No.: 12/264,852

(22) Filed: Nov. 4, 2008

(65) Prior Publication Data

US 2010/0113142 A1 May 6, 2010

(51) Int. Cl.
*A63F 13/12* (2006.01)

(52) U.S. Cl.
USPC .............................................. 463/42; 463/19

(58) Field of Classification Search
USPC ..................................................... 463/19, 42
See application file for complete search history.

(56) References Cited

U.S. PATENT DOCUMENTS 5,762,552 A * 6/1998 Vuong et al. .................... 463/25
6,530,840 B1 * 3/2003 Cuomo et al. .................. 463/42
6,641,481 B1 * 11/2003 Mai et al. ........................ 463/42
7,338,368 B2 * 3/2008 Lind et al. ........................ 463/19
7,481,707 B1 * 1/2009 Luciano et al. ................. 463/19
8,051,196 B2 * 11/2011 Ruppert ........................ 709/232
2004/0152499 A1 * 8/2004 Lind et al. ........................ 463/16
2005/0208991 A1 * 9/2005 Luciano et al. ................. 463/19
2006/0063593 A2 * 3/2006 Moshal ........................... 463/42
2006/0247053 A1 * 11/2006 Mattila ........................... 463/42
2007/0060237 A1 * 3/2007 Rowe et al. ..................... 463/12
2008/0176626 A1 * 7/2008 Okada ............................. 463/19

* cited by examiner

*Primary Examiner* — Dmitry Suhol
*Assistant Examiner* — Jay Trent Liddle
(74) *Attorney, Agent, or Firm* — Brooke Quist; Marvin Hein

(57) ABSTRACT

Various embodiments of a gaming system for coordinating a distributed game in a gaming environment are disclosed herein. According to one embodiment, the gaming system includes a polymorphous network of game managers. In the polymorphous network, each game manager is dynamically interconnected with one or more of the other game managers, and the dynamic interconnections are based on a game manager criteria or gaming data. The gaming system also includes a plurality of groups of gaming machines where a first group of gaming machines is only in communication with a first game manager. The first game manager receives game requests from the first group of gaming machines to initiate a game. The first game manager initiates the game if a sufficient number of game requests are received by the first game manager. Alternatively, the first game manager forwards the game requests to an appropriate game manager if the first gaming machine manager receives an insufficient number of game requests.

19 Claims, 4 Drawing Sheets

SYSTEMS FOR COORDINATING A DISTRIBUTED GAME IN A GAMING ENVIRONMENT

CROSS-REFERENCE TO RELATED APPLICATIONS

This application is related to co-pending U.S. patent application Ser. No. 12/264,863 concurrently filed on Nov. 4, 2008, entitled METHODS FOR COORDINATING A DISTRIBUTED GAME IN A GAMING ENVIRONMENT, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The description relates generally to wide-area, distributed gaming systems.

BACKGROUND

The rapid advances in computer and software technologies has allowed the gaming industry to offer a large variety of highly sophisticated and entertaining gaming options to casino patrons. For example, a typical casino offers a variety of electronic wagering games, such as video and mechanical slots, video poker, blackjack video keno, video bingo, video pachinko, craps, roulette, and the like. These games are typically implemented as software applications that run on special-purpose computerized gaming machines. The gaming machines are, in turn, connected into gaming networks, such as an Internet Protocol (IP) based local or wide area networks. The size of such gaming networks frequently reaches several thousand gaming machines.

Typically, gaming networks use a hub-and-spoke topology, in which gaming machines are connected to one or more centralized gaming servers. The gaming server(s) manage and control operation of the gaming applications, as well as provide various services to the gaming machines, such as billing and user authentication services. The size of these gaming network and a large amount of network traffic generated by the gaming machines and servers in a gaming network having hub-and-spoke architecture can sometimes result in difficulties related to configuration, management, and resource allocation. Moreover, there can be inherent limitations that exist in this type of network architecture that sometimes impede the development of gaming applications that run across multiple gaming machines, particularly when attempting to provide highly dynamic and interactive gaming environment to casino patrons.

SUMMARY

Briefly, and in general terms, various embodiments disclosed herein are directed to systems and methods for coordinating a distributed game in a gaming environment. According to one embodiment, the gaming system includes a polymorphous network of game managers. In the polymorphous network, each game manager is dynamically interconnected with one or more of the other game managers, and the dynamic interconnections are based on a game manager criteria or gaming data. The gaming system also includes a plurality of groups of gaming machines where a first group of gaming machines are only in communication with a first game manager. The first game manager receives game requests from the first group of gaming machines to initiate a game. The first game manager initiates the game if a sufficient number of game requests are received by the first game manager. Alternatively, the first game manager forwards the game requests to an appropriate game manager if the first gaming machine manager receives an insufficient number of game requests.

In another embodiment, the gaming system includes a plurality of groups of gaming machines in which each group of gaming machines is in communication with a dedicated game manager. The gaming system also includes a polymorphous network of dedicated game managers in which each dedicated game manager is dynamically interconnected with one or more of the dedicated game managers in the gaming system. The dedicated game managers operate in a cooperative manner to gather a sufficient number game requests from the plurality of groups of gaming machines in order to initiate a gaming session.

In yet another embodiment, the gaming system includes a plurality of groups of gaming machines. The gaming system also includes a plurality of game controller devices in which each game controller is in communication with a group of gaming machines. The gaming system further includes a plurality of game managers in communication with the plurality of game controller devices. Each game manager is dynamically interconnected with one or more of the game managers in the gaming system. The game managers operate in a cooperative manner to gather a sufficient number game requests from the plurality of groups of gaming machines in order to initiate a gaming session.

In addition to gaming systems, various methods for coordinating a distributed game in a gaming system having a polymorphous network of game managers and one or more gaming terminals are disclosed herein. According to one method, a player request is received at a dedicated game manager to participate in a distributed game where the dedicated game manager is in communication with other game managers in the polymorphous network. The dedicated game manager then determines whether it is an appropriate session host to satisfy the player request. If the dedicated manager is deemed the appropriate session host for the distributed game, play of the distributed game is managed at the dedicated game manager. Otherwise, the player request is forwarded to the appropriate session host.

In another method, a game manager is designated as a default session host for a first gaming session within a polymorphous network. The polymorphous network includes a plurality of game managers that are dynamically interconnected with one or more of the other game managers. A player request to participate in a distributed game is received at a first game manager. If the first game manager is the default session host for the first gaming session, the first game manager manages play of the distributed game. If the first game manager is not the default session host, the first game manager is associated with the default session host for the first gaming session, and the player request is forwarded to the default session host for processing. Alternatively, if the first game manager cannot be associated with the default session host for the first gaming session, a second gaming session, which is separate and distinct from the first gaming session, is created with the first game manager designated as a second session host.

In yet another method, a player request to participate in a distributed game is received at a dedicated game manager that is in communication with other game managers in a polymorphous network. If the dedicated manager is deemed the appropriate session host for the distributed game, play of the distributed game is managed by the dedicated game manager. If the dedicated game manager is not the appropriate session host, the player request is forwarded to the appropriate session host. Alternatively, if the player request can not be forwarded to the appropriate session host, a second gaming session is created with the dedicated game manager being designated as the default session host.

In addition to methods for coordinating a distributed game in a gaming system having a polymorphous network of game managers, various methods of reducing cheating in a distributed game presented on a plurality of gaming machines in a gaming system are disclosed herein. According to one method, at least two player requests are received at a dedicated game manager to participate in a distributed game. The game manager determines whether a low bettor is a sleeper and whether a high bettor is a beneficiary in the distributed game. The sleeper is a player that refuses to accept a prize to the benefit of another player (i.e., the beneficiary). The game manager then flags the gaming machines designated as the sleeper and the beneficiary in future gaming sessions. Once designated, the sleeper and the beneficiary are prevented from both joining a same game in future gaming sessions.

In another method, a determination is made to whether a first gaming machine receiving a low bet is a sleeper in a distributed game and whether a second gaming machine receiving a high bet is a beneficiary in the distributed game. The sleeper is defined as a gaming machine (or player) refuses to accept a prize to the benefit of the beneficiary. The gaming machines determined to be sleeper and the beneficiary are flagged, and the game manager prevents the sleeper and the beneficiary from both joining a same game in a future gaming session.

In yet another method, game play is monitored for suspicious gaming activity that includes a gaming machine receiving a low bet and refusing a prize for a winning outcome. The gaming machine receiving the low bet and refusing the prize is flagged as a sleeper. The gaming machine receiving the high bet and accepting the prize is flagged as a beneficiary. Once designated, the gaming system prevents the sleeper and the beneficiary gaming machines from both joining a same game in a future gaming session. The sleeper and beneficiary flags are removed from the gaming machines in response to a cash out event or a predetermined number of games without any suspicious gaming activity.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to systems and methods for coordinating a distributed game in a gaming environment. Generally, the gaming system presents a distributed game to one or more gaming terminals, in which the distributed game may be a Class 2 bingo, lotto, or lottery game. The gaming system also includes a plurality of game managers, which are responsible for coordinating and managing play of the distributed game. Each of the game managers is fully accessible to other game managers in the gaming system. This accessibility allows a game manager to dynamically form interconnections with other game managers in the system. Given this dynamic structure, game requests (received at a game manager) may be satisfied or quickly routed to an appropriate game manager within the gaming system. As a result, the gaming system maximizes game play by reducing the time needed to obtain a sufficient number of game requests since the gaming requests received at a local game manager may be forwarded onto a busier game manager that can satisfy the request. Additionally, game play is maximized as game denials due to time outs or other time delays are minimized because game managers having low request rates can forward receive game requests to busier gaming managers within the gaming system.

In one embodiment, the gaming system is configured as a polymorphous network of game managers. A polymorphous network, as defined and described herein, relates to a network of game managers having varying network interconnections between the game managers. For example, a gaming network having four game managers (e.g., A, B, C, and D) may be initially interconnected as A to B, B to C, and C to D. From gaming session to gaming session (i.e., from game to game), the interconnections between the game managers may change in response to gaming data (e.g., local rate of play at game manager), thereby creating new interconnections between the game managers.

Additionally, the polymorphous network may also be a cooperative network. In a cooperative network, the game managers work or act together for a common purpose. In one embodiment, the common purpose is allowing players at any gaming site (e.g., gaming establishment) to play against other players at another gaming site, same gaming site, or shared central site provided that cooperation has been arranged (or designated) and a link is available. In another embodiment, the common purpose is minimizing game delays (i.e., reducing the time between the game request and game play). In yet another embodiment, the common purpose is minimizing or eliminating game denials (i.e., game request is not satisfied).

Figure 1:
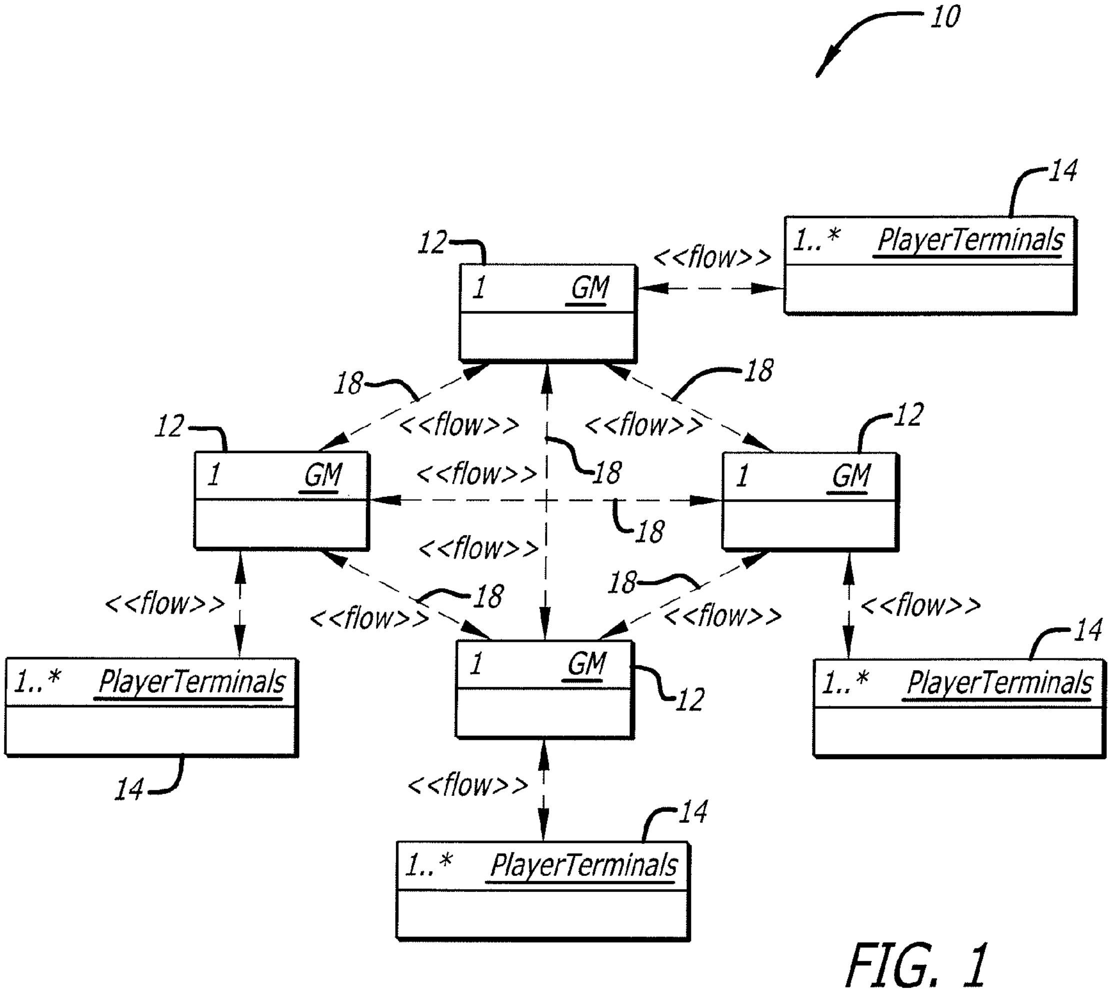
FIG. 1 is a block diagram of one embodiment of a gaming system.

Referring now to the drawings, wherein like reference numerals denote like or corresponding parts throughout the drawings and, more particularly to FIGS. 1-4, there is shown various embodiments of adaptable gaming system 10 for coordinating distributed gaming participation. Specifically, FIG. 1 shows a gaming system 10 having a plurality of game managers 12 and a plurality of groups of gaming terminals 14, which may also be referred to as a gaming machine or gaming device. FIG. 1 illustrates a gaming system 10 having four game managers 12, but it is contemplated that the gaming system may have any number of game managers. The game managers 12 may be in the same gaming establishment or maybe located in a plurality of gaming establishments. The game managers 12 carry out functions such as, but not limited to, gathering multiple player terminals 14 into a game session, executing a game, and notifying the player terminals of winners. The player terminal 14 is an interface with a player that presents the distributed game (e.g., Class II Bingo, Lotto, or a lottery game) as wells as other gaming functions such as, but not limited to, receiving a wager and paying out any winnings.

Figure 2:
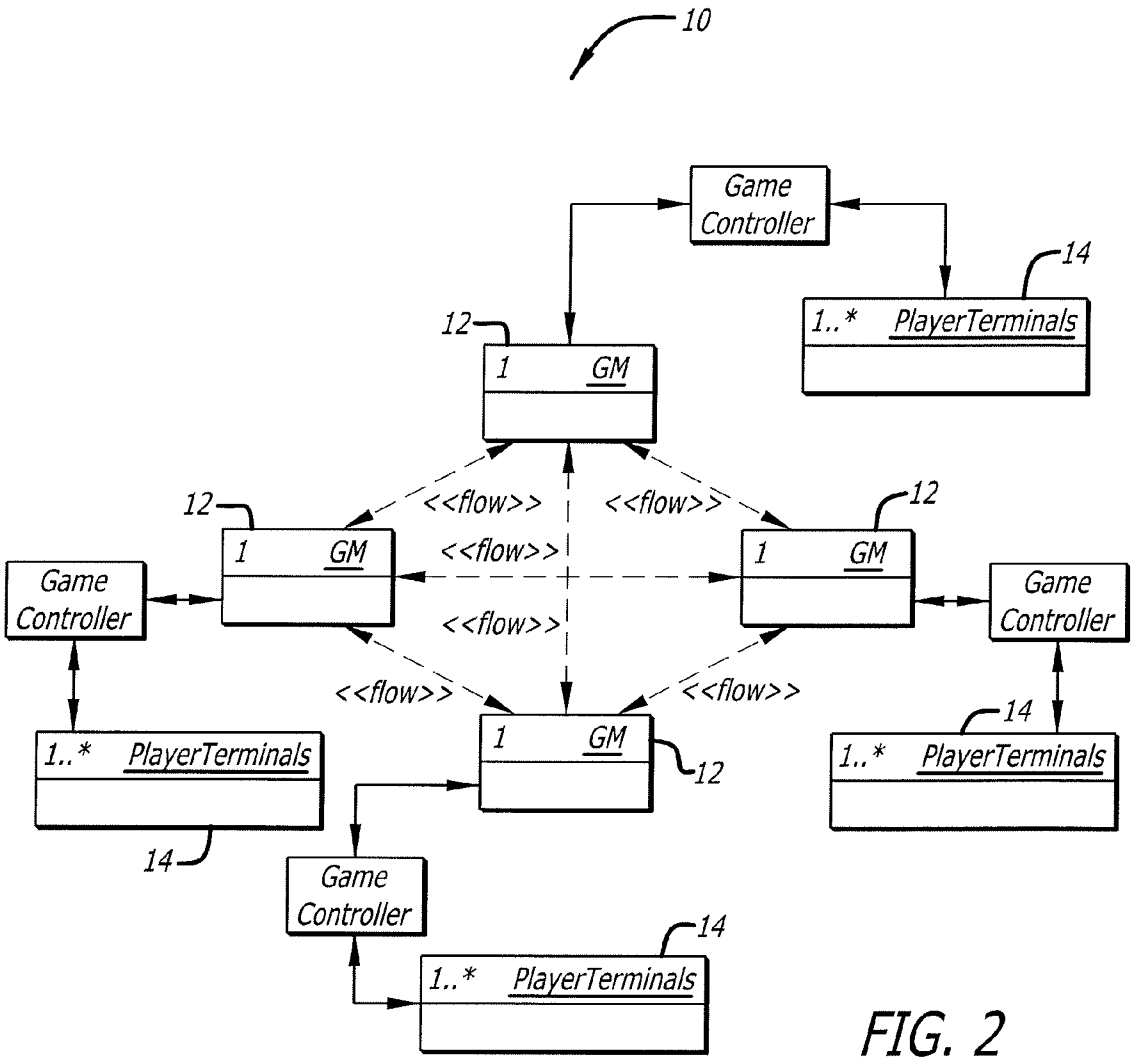
FIG. 2 is a block diagram of another embodiment of a gaming system.

As shown in FIG. 1, each group of gaming terminals 14 has a direct communication link 16 with their respective game manager 12. According to one embodiment, up to 500 player terminals 14 may be coupled to each game manager 12. In another embodiment, the game manager 12 may support approximately 1000-2000 player terminals 14. The gaming terminals 14 and game managers 12 may in communication by an Ethernet connection, Wi-Fi connection, or other types of connections known or developed in the art. Alternatively, as shown in FIG. 2, the gaming terminals 14 may be connected to game manager 12 through an intermediary device such as a game controller 18. In one embodiment, the game controller 18 reports meters and particular game events from the player terminals 14 to the game manager 12.

In some embodiments, the game controller has additional functions depending on the type of bingo game. Some bingo games are "score-based" in which the game decides an award amount based on the balls drawn, and other bingo games are "template-based" in which the bingo system provides a lottery-style prize to the game. If the bingo game is "template-based," the game controller 18 creates and manages the lottery pools and subsets of the lottery pool. Additionally, the game controller 18 also distributes prizes drawn from the subsets of pools in response to a game play request from a player at the gaming terminal.

In FIG. 1, the dotted lines 18 represent the possible connections between each of the game managers 12. As shown in FIG. 1, each game manager 12 may be dynamically interconnected with the other game managers in the gaming system 10. The connections are "dynamic" because the connections can change from gaming session to gaming session. It is also contemplated that not every game manager 12 needs to be a participant in the gaming session. Rather, a gaming session may be formed from less than all the game managers 12. Accordingly, the groups of game managers 12 that are members of the game session may vary from session to session.

Additionally, each of the game managers 12 is an "equal" to the other gaming managers. Unlike traditional hub and spoke networks, none of the game managers 12 is a hierarchical master (i.e., a game manager that only communicates with a few, specific game managers). Accordingly, in the gaming system 10 shown in FIG. 1, each game manager 12 has fall access to any other game manager within the system 10. The gaming system 10 does not need to escalate a game request to a higher level device to fulfill a game request. Rather, the request is merely handled locally or forwarded to another game manager 12.

According to one embodiment, the game manager devices 12 include a processor for executing one or more algorithms for coordinating game request amongst a plurality of game managers. Additionally, the game managers 12 include one or more game applications that control game play and communications between the game manager and the player terminals 14. In one embodiment, the game application can also select the best host (local or remote) to satisfy a request for gaming participation. Alternatively, the software and/or hardware for coordinating game requests and establishing gaming sessions is independent of the game application. For example, in one embodiment, the software is an independent subsystem that routes game play messages to a host that can best satisfy the gaming request. The software is used in conjunction with the game application to implement a virtual network and routing for game play messages.

In another embodiment, the game manager 12 includes a coupler. The coupler establishes a communication link between two game managers 12. The coupler establishes the communication link between the game managers by either listening for requests (e.g., similar to a server) or establishing connections (e.g., similar to a client). The coupler implements a gaming session network using the proper program based upon the target game manager 12. For example, the coupler would implement a gaming session network (form interconnections between two game managers) using DirectX's DirectPlay peer interface if the target game manager is Windows-based applications. Alternatively, the coupler would implement a gaming session network (form interconnections between two game managers) using TCP sockets. It is also contemplated that other forms of IP transport such as, but not limited to, HTTP or HTTPS may be used to implement a gaming session network.

Unlike traditional peer-to-peer networks, the gaming session network formed by the network coupler does not require a session host, (i.e., one game manager designated as the hierarchical "master" of all the other game managers). In contrast, when a connection is made between two game managers and a socket is opened, each game manager is treated the same (i.e., there is no hierarchy between the two game managers). Additionally, the gaming session formed by the coupler does not require closure (i.e., a network session is established only when all the game managers are in communication with all the other game managers within the network). Rather, the gaming session may be formed by any number of game managers so long as there are a sufficient number of game requests.

The game managers 12 also include one or more ports for receiving and sending current status information that can be used to properly coordinate and route game requests. The game managers 12 further include a game engine, which entails the actual grouping of player requests and the execution of the central determination game. Additionally, each game manager is "provisioned" (i.e., given the addresses of the other members of the cooperative) in order to properly coordinate the central determination game. According to one embodiment, the game managers 12 are in communication with one another via an Ethernet network, a wireless network, wireless local area network, or an optical fiber network.

Additionally, each game manager is assigned a 64-bit identifier. The first portion of the 64-bit identifier is dedicated to the IP address of the game manager of the requesting game. The second portion of the 64-bit address is dedicated to the IP address of the requesting gaming machine. The different portions of the 64-bit address allows game play messages to be routed from the game manager executing the distributed game through the game manager to which the game is connected to the appropriate game terminal. In some instances, the game manager executing the distributed game and the game manager connected to the game terminal are the same game managers. In other instances, these game managers are different game managers.

Figure 3:
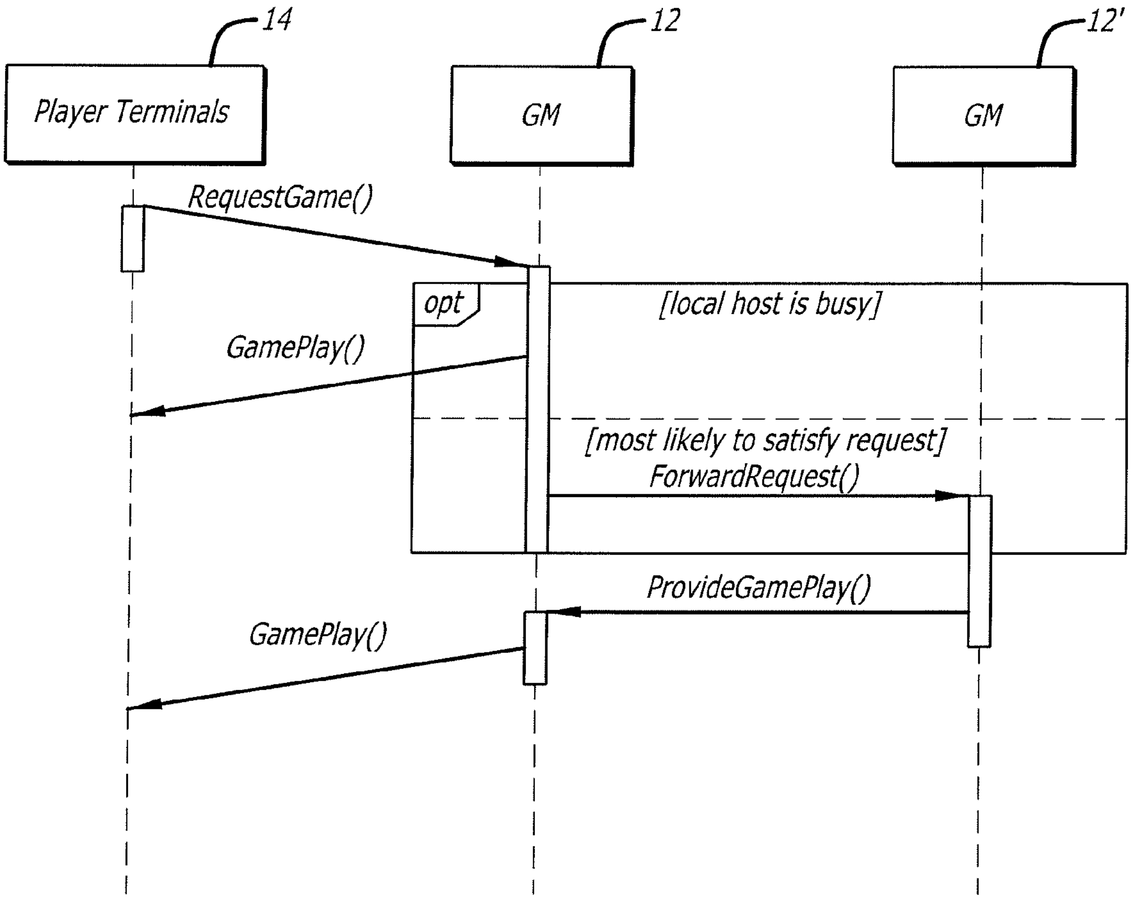
FIG. 3 illustrates game flow for the gaming system shown in FIG. 1.

FIG. 3 illustrates how a game manager 12 handles a game request. Generally, there are two possible options of handling a request. The local game manager 12 may handle the request locally or forward the request to another (or remote) game manager 12' in the gaming session. As shown in FIG. 3, the player terminal 14 sends a game request to the local game manager 12. The local game manager 12 satisfies the request (e.g., executes game) and sends a game play message to player terminal 14. Alternatively, as shown below the dotted line in FIG. 3, the game request is forwarded from the local game manager 12 to another (remote) game manager 12' in the gaming session. The (remote) game manager 12' receiving the forwarded game request satisfies the request and sends game play back to the forwarding game manager 12. The local game manager 12 then sends the game play message to the requesting player terminal 14.

When the game request is received at the local game manager 12, a selection algorithm allows the local game manager 12 to determine whether the game request should or should not be satisfied. In order for the selection algorithm to make a proper determination of routing the game request, each of the game managers 12 need to be appraised of the current status information of all the other game managers in the session. The selection algorithm compares the local request rate of the game manager device 12 to the request rates of other game managers in the session. If the local request rate is low (as compared to other request rates), the local game manager 12 forwards the game request directly to the game manager 12 most likely to satisfy the request. Otherwise, the local game manager will satisfy the game request if the local request rate is sufficient to support and satisfy the game request.

Figure 4:
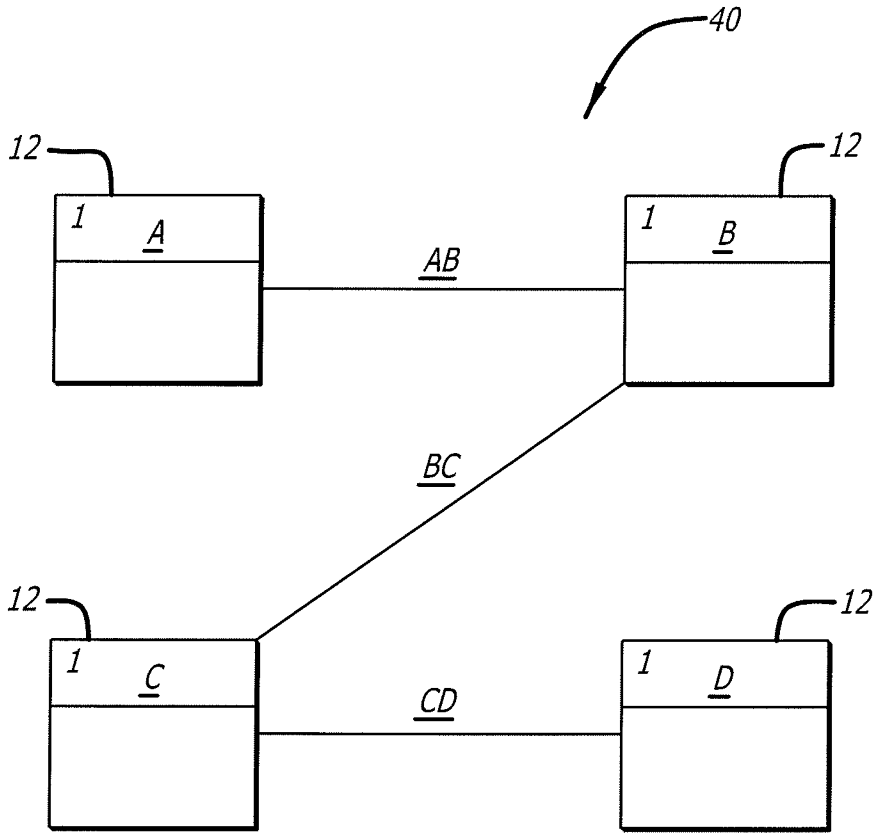
FIG. 4 is a block diagram of another embodiment of a gaming system.

FIG. 4 illustrates one embodiment of a polymorphous cooperative network 40. In one embodiment, the polymorphous network 40 is composed of a general purpose network layer and a connection rule where game managers 12 listen for other managers on an agreed port allows a system to establish a polymorphous network. The connection rules establish which game managers will initiate connections other game managers so that only one game manager in any given pairing initiates the connection in order to avoid any cross-connections between a pair of managers. According to one embodiment, the game manager that will establish the connection between a pairing of game managers is based upon game manager criteria such as, but not limited to, an internet protocol (IP) address. For example, each game manager 12 connects to each designated game manager with a lower IP address, and the game managers will maintain the connection, as needed. Alternatively, the game managers may be assigned different definitions that determine whether a game manager will initiate a connection or the "local host" will initiate the connection.

In another embodiment, the host chosen upon receiving a game request may also be selected based upon gaming data. Gaming data may be a "local game request rate," which is defined as the number of game requests over a given time period received by the game manager from player terminals connected to the game manager. Alternatively, gaming data may be a "local game session rate," which is defined as the number of gaming sessions occurring at a game manager over a given period of time. In another embodiment, the gaming data is a "local forward rate," which is defined as the number of game requests (from gaming terminals connected to the game manager) forwarded over a defined period of time to another game manager within the network. In yet another embodiment, the gaming data is a "local provide rate," which is defined as the number of forwarded game requests the game manager is executing.

In one embodiment, these various rates may be smoothed out using a moving average. Additionally, the rates may be calibrated to other settings such as, but not limited to, timeouts. In one embodiment, determinants of these rates include second-order derivatives of the rates so that shifts in the rates can be quickly detected. The rate data is used to maximize the session rate (number of games presented over a period of time).

Referring back to FIG. 4, the following describes an example of the application of the rules for a polymorphous cooperative 40. As shown in FIG. 4, the game managers 12 are connected from A to B, B to C, and C to D. This example illustrates how different game managers may be used to fulfill game requests from gaming session to gaming session (or game to game). In this example, a game request originates at a gaming terminal connected to game manager B, and there are no other game requests are received at other game managers A, C, and D. Accordingly, the game is executed locally at game terminal B. Later, a game play request originates at a gaming terminal connected to game manager C. The game play request is forwarded to game manager B since game manager is showing a session rate. Game requests then start at game manager D. Although game manager C does not have a session rate, the game requests from game manager D are forwarded to game manager C because game manager C is showing local game requests. Game manager C then matches its own local requests with the game requests from game manager D. Game manager B, now having an insufficient number of game requests to self-sustain a game, sees a session rate on game manager C, and game manager B starts sending game requests to game manager C. As a result, game manager C satisfies the game request rather than game manager B.

Another aspect of the polymorphous cooperative includes defensive measures to prevent a player or players from taking advantage of the cooperative system presenting a Class 2 bingo game. Class 2 bingo games require multiple players to be grouped together for play of the bingo to proceed, and for each play of the bingo game there is typically a winner and a loser. In order to maximize game play (i.e., the number of games offered over time), the game manager may group players together having disparate bet amounts. In a "sleeper-beneficiary" scenario, a wily player can cheat the system. In this scenario, the player occupies two player terminals and places a minimum bet on one player terminal while placing a maximum bet on the other player terminal. The player can tell if the two gaming machines are in the same game session if the game start message, initial ball draw, sounds or graphics for the games are initiated at the same time. If the player determines that the two gaming machines are playing games in separate gaming sessions, the player will play the games normally. If the player determines that the two gaming machines are playing games in the same gaming session, the player does not daub if the low-bet terminal wins a prize. The session will time out waiting for the low-bet daub, and the game will continue (i.e., draws more balls) until the high-bet terminal gets a prize. The player will then accept the prize for the high-bet terminal as opposed to the low-bet terminal. Otherwise stated, the small bet is the "sleeper" and does not accept prizes, and the high bettor is a "beneficiary" because the high better always wins (as compared to the sleeper).

In order to detect a "beneficiary" and the "sleeper" in the "sleeper-beneficiary" scenario, a game manager looks for a high bettor is playing against a low better in a gaming session. The game manager also looks for a situation in which the low bettor has won a prize(s) yet refuses to collect the prize(s). This player is flagged as a "sleeper." The high bettor is the player in this scenario that accepts the prize(s). The high bettor is flagged as the "beneficiary." Messages identifying the "sleeper" and the "beneficiary" are sent along with the award message to the player terminals. When subsequent games are played on the "sleeper" or "beneficiary" player terminals, a "sleeper" or "beneficiary" flag is sent along with a game request.

Once a player is identified as a "sleeper" or a "beneficiary," certain rules are implemented for subsequent game requests until the flags are reset. According to one embodiment, the "sleeper" can only join bingo games with other players making the same or lower wager. Additionally, the bingo games that the "beneficiary" may also be restricted so that the "beneficiary" is only allowed to play games other players who have the same wager, higher wagers, or lower bettors that do not include the "sleeper." Lastly, a "beneficiary" who places a low bet cannot be placed in a game where the "sleeper" is a high bettor. This rule guards against the scenario in which the player reverses roles between the "sleeper" and the "beneficiary." These rules apply regardless of the order of the request arrivals and have no influence on ranking and routing of game requests.

While the "sleeper" and "beneficiary" flags may reduce participation because it disallows suspicious play, the flags should be reset as soon as possible. Accordingly, there are basic rules for resetting the "sleeper" and "beneficiary" flags. According to one embodiment, a cash out event by the "sleeper" and/or the "beneficiary" clears the flags. In another embodiment, the flags are reset after a predetermined number of normal game plays (i.e., game play on a game terminal that is not involved in sessions with suspicious refusals). In yet another embodiment, the flags are reset after a predetermined number of voided game plays (i.e., player may be an innocent novice). The predetermined number of games required to reset the flags may be initially set at seven games (or any other number of games). Alternatively, the number of games required to reset the flags may be increased if the game terminal and/or game manager detects a pattern of sleeping at a particular player terminal. For example, ten consecutive games of non-suspicious game play may be required to reset a flag.

Optionally, in the event a sleeper is detected, a message may be sent to casino floor manager or other individuals at the gaming establishment to monitor one or more player terminals. In yet another embodiment, the gaming machine(s) suspected of suspicious play presents may be a message to the player. The message may be a basic message such as, but not limited to, presenting the player with the option to review the rules of the game or presenting flashing lights or sounds with a message to accept an award. In another embodiment, a warning message that the player is suspected of suspicious play is presented on the gaming machine.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming system, comprising:

a polymorphous network of game managers, each game manager being directly connected with the other game managers, wherein none of the game managers is a central device configured to act as a hierarchical master, each game manager having full access to each other game manager where game requests from each game manager need not be escalated to a higher level device and dynamic interconnections being based on a game manager criteria or gaming data, wherein the gaming data is a local game request rate at the game manager, a local game session rate occurring at the game manager, a local forward rate occurring at the game manager, or a local provide rate occurring at the game manager; and a plurality of groups of gaming machines, a first group of gaming machines only in direct communication with a first game manager, the first game manager receiving game requests from the first group of gaming machines to initiate a game, the first game manager initiating the game when a sufficient number of game requests are received by the first game manager, and the first game manager forwarding the game requests to an appropriate game manager if the first game manager receives an insufficient number of game requests, the appropriate game manager decided based off the gaming data.

2. The gaming system of claim 1, wherein the game manager criteria includes an IP address of each game manager.

3. The gaming system of claim 1, wherein the plurality of groups of gaming machines are located at different gaming establishments.

4. The gaming system of claim 1, wherein the game is a Class 2 bingo game, lotto game, or lottery game.

5. The gaming system of claim 1, further comprising an accounting system in communication with the plurality of groups of gaming machines.

6. The gaming system of claim 1, further comprising a player tracking system in communication with the plurality of groups of gaming machines.

7. A gaming system, comprising:

a plurality of groups of gaming machines, each group of gaming machines being in communication with a dedicated game manager; and a polymorphous network comprising a plurality of dedicated game managers, each dedicated game manager being dynamically interconnected with one or more dedicated game managers, wherein each dedicated game manager is directly connected with a remainder of the plurality of dedicated game managers in the polymorphous network, each game manager having full access to each other game manager where game requests from each game manager need not be escalated to a higher level device and the dedicated game managers operating in a cooperative manner to gather a sufficient number of game requests from the plurality of groups of gaming machines in order to initiate a gaming session, wherein none of the dedicated game managers is a hierarchical master, and wherein dynamic interconnections are based on gaming data, the gaming data being a local game request rate at the game manager, a local game session rate occurring at the game manager, a local forward rate occurring at the game manager, or a local provide rate occurring at the game manager, and game requests are forwarded to an appropriate game manager based off the gaming data.

8. The gaming system of claim 7, further comprising a plurality of game controllers, the gaming controllers being intermediary devices between the gaming machines and the game managers.

9. The gaming system of claim 7, wherein each game manager further comprises a processor for operating a selection algorithm for dynamically designating a dedicated game manager as a session host for the gaming session.

10. The gaming system of claim 7, wherein the plurality of groups of gaming machines are located at different gaming establishments.

11. The gaming system of claim 7, wherein the game is a Class 2 bingo game, lotto game, or lottery game.

12. The gaming system of claim 7, further comprising an accounting system in communication with the plurality of groups of gaming machines.

13. The gaming system of claim 7, further comprising a player tracking system in communication with the plurality of groups of gaming machines.

14. A gaming system, comprising:

a plurality of groups of gaming machines;

a plurality of game controller devices, each game controller being in communication with a group of gaming machines; and a plurality of game managers in communication with the plurality of game controller devices, each game manager being dynamically interconnected with one or more game managers, wherein each game manager is directly connected with a remainder of the plurality of game managers in the polymorphous network, each game manager having full access to each other game manager where game requests from each game manager need not be escalated to a higher level device and the game managers operating in a cooperative manner to gather a sufficient number of game requests from the plurality of groups of gaming machines in order to initiate a gaming session, wherein each game manager has full access to any other game manager, and wherein dynamic interconnections are based on gaming data, the gaming data being a local game request rate at the game manager, a local game session rate occurring at the game manager, a local forward rate occurring at the game manager, or a local provide rate occurring at the game manager, and game requests are forwarded to an appropriate game manager based off the gaming data.

15. The gaming system of claim 14, wherein each game manager further comprises a processor for operating a selection algorithm for dynamically selecting a game manager to execute the game requests for the gaming session.

16. The gaming system of claim 14, wherein the plurality of groups of gaming machines are located at different gaming establishments.

17. The gaming system of claim 14, wherein the game is a Class 2 bingo game or lottery game.

18. The gaming system of claim 14, further comprising an accounting system in communication with the plurality of groups of gaming machines.

19. The gaming system of claim 14, further comprising a player tracking system in communication with the plurality of groups of gaming machines.

* * * * *